US010633103B2

(12) United States Patent
Joret et al.

(10) Patent No.: US 10,633,103 B2
(45) Date of Patent: Apr. 28, 2020

(54) PROPULSION UNIT FOR AN AIRCRAFT AND METHOD FOR OPENING A MOVABLE COWL OF SAID PROPULSION UNIT (71) Applicant: SAFRAN NACELLES, Gonfreville l'Orcher (FR)

(72) Inventors: Jean-Philippe Joret, Beuzeville (FR); Emmanuel Lesteven, Triqueville (FR); Vincent Peyron, Le Havre (FR); Patrick Boileau, Tournefeuille (FR)

(73) Assignee: SAFRAN NACELLES, Gonfreville l'Orcher (FR)

( * ) Notice: Subject to any disclaimer, the term of this patent is extended or adjusted under 35 U.S.C. 154(b) by 489 days.

(21) Appl. No.: 15/453,308

(22) Filed: Mar. 8, 2017

(65) Prior Publication Data
US 2017/0174353 A1 Jun. 22, 2017

Related U.S. Application Data (63) Continuation of application No. PCT/FR2015/052365, filed on Sep. 7, 2015.

(30) Foreign Application Priority Data

Sep. 8, 2014 (FR) ...................... 14 58399

(51) Int. Cl.
*B64D 29/06* (2006.01)
*F02K 1/76* (2006.01)
*B64D 27/16* (2006.01)
(52) U.S. Cl.
CPC .............. *B64D 29/06* (2013.01); *F02K 1/763* (2013.01); *B64D 27/16* (2013.01);
(Continued)

(58) Field of Classification Search
CPC ......... B64D 29/00; B64D 29/06; F02K 1/763; F02K 1/645; F02K 1/64; F02K 1/70; F02K 1/72; F05D 2230/72; F05D 2230/80
(Continued)

(56) References Cited

U.S. PATENT DOCUMENTS 4,399,966 A     8/1983 Crudden et al.
2012/0125191 A1* 5/2012 Moradell-Casellas ......................
                                                  B64D 29/06
                                                  92/15

FOREIGN PATENT DOCUMENTS

FR    2771710    6/1999
FR    2920145    2/2009

OTHER PUBLICATIONS

International Search Report for International Application PCT/FR2015/052365, dated Dec. 7, 2015.

* cited by examiner

*Primary Examiner* — Richard A Edgar
*Assistant Examiner* — Maxime M Adjagbe
(74) *Attorney, Agent, or Firm* — Burris Law, PLLC (57) ABSTRACT A propulsion unit for an aircraft is provided. The propulsion unit includes a stationary unit having at least one cowl pivotally mounted on an axis collinear with a longitudinal axis of the propulsion unit between an operating position or a maintenance position allowing access to the turbojet engine for regular maintenance operations and irregular maintenance operations. The maintenance position for irregular maintenance operations includes an opening angle of the cowl that is greater than the opening angle of the cowl to carry out regular maintenance operations. The propulsion
(Continued)

unit further includes at least one cylinder and at least one safety connecting rod secured to the cowl and stationary unit.

10 Claims, 8 Drawing Sheets

(52) U.S. Cl.
CPC .... *F05D 2220/323* (2013.01); *F05D 2230/72* (2013.01); *F05D 2250/11* (2013.01); *F05D 2260/57* (2013.01)

(58) Field of Classification Search
USPC .................................................. 60/796, 798
See application file for complete search history.

PROPULSION UNIT FOR AN AIRCRAFT AND METHOD FOR OPENING A MOVABLE COWL OF SAID PROPULSION UNIT

CROSS-REFERENCE TO RELATED APPLICATIONS

This application is a continuation of International Application No. PCT/FR2015/052365, filed on Sep. 7, 2015, which claims the benefit of FR 14/58399 filed on Sep. 8, 2014. The disclosures of the above applications are incorporated herein by reference.

FIELD

The present disclosure relates to a propulsion unit for an aircraft and a method for opening a movable cowl of said propulsion unit.

BACKGROUND

The statements in this section merely provide background information related to the present disclosure and may not constitute prior art.

An aircraft is driven by several turbojet engines each housed within a nacelle. A nacelle has generally a tubular structure along a longitudinal axis comprising a fixed upstream section constituted by an air inlet upstream of the turbojet engine, a fixed median section intended to surround a fan of the turbojet engine, a downstream section accommodating thrust reversal means and intended to surround the combustion chamber of the turbojet engine, the upstream and the downstream of the nacelle being defined with reference to the flow direction of the airflow in the nacelle in direct jet operation, the upstream of the nacelle corresponding to a portion of the nacelle by which the airflow enters, and the downstream corresponding to an ejection area of said airflow.

A propulsion unit for an aircraft is constituted by a nacelle and by a turbojet engine. A downstream portion of a propulsion unit 1 for an aircraft is shown schematically in FIG. 1, in the closed position. Such a propulsion unit 1 is typically suspended from a fixed structure of the aircraft, for example under a wing or on the fuselage, by means of a suspension mast 3 fastened to the turbojet engine 5.

The modern nacelles are intended to accommodate a bypass turbojet engine capable of generating, by means of the rotating fan blades, a hot airflow (also called "primary flow") coming from the combustion chamber of the turbojet engine, and a cold airflow ("secondary flow) which circulates outside the turbojet engine through an annular passage, also called flow path. The terms "downstream" and "upstream" refer here to the flow direction of air circulation in the turbojet engine. A turbojet engine includes usually a section called "upstream" section comprising the fan blades and a section called "downstream" section accommodating the gas generator.

Figure 1:
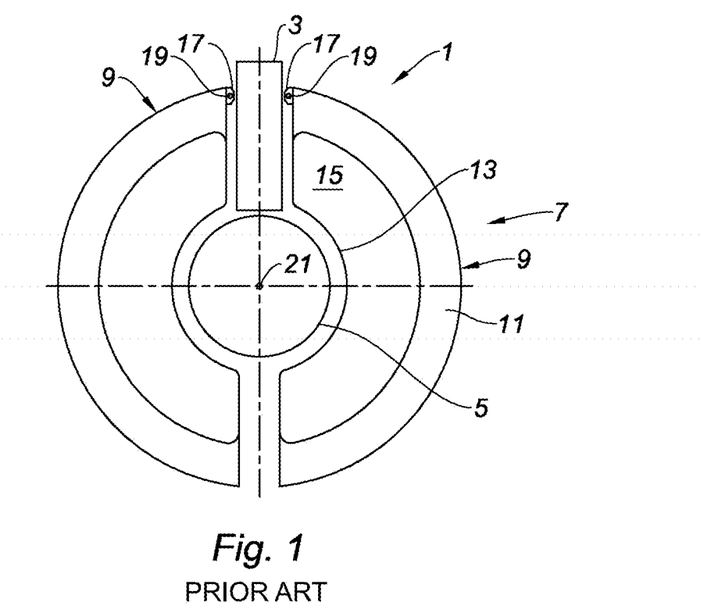
FIG. 1 shows schematically a downstream portion of a propulsion unit of the prior art, in the closed position.

The downstream portion of a propulsion unit comprises a thrust reverser 7 comprising two semi-annular half-cowls 9 surrounding the downstream section of the turbojet engine 5.

The thrust reverser 7 shown in FIG. 1 is of the "D-duct" type, that is to say, each half-cowl 9 of the thrust reverser comprises an outer fixed half-structure 11, called "Outer Fixed Structure" (OFS) and a concentric inner fixed half-structure 13, called "Inner Fixed Structure" (IFS), surrounding the structure itself of the engine downstream of the turbojet engine and secured to the outer fixed half-structure 11.

The inner 11 and outer 13 half-structures define a flow path 15 intended to channel the flow of cold air which circulates outside the turbojet engine. The primary and secondary flows are ejected from the engine by the rear of the nacelle.

The outer fixed structure 13 comprises an upstream portion and a downstream portion on which is mounted a cowl (not shown in Figures) which is movable in translation and adapted to cover thrust reversal means when the latter are not used. In case there is a desire for the thrust reversal means, the movable cowl is translated downstream to a position called "reverse jet position" in which the thrust reversal means are discovered.

Figure 2:
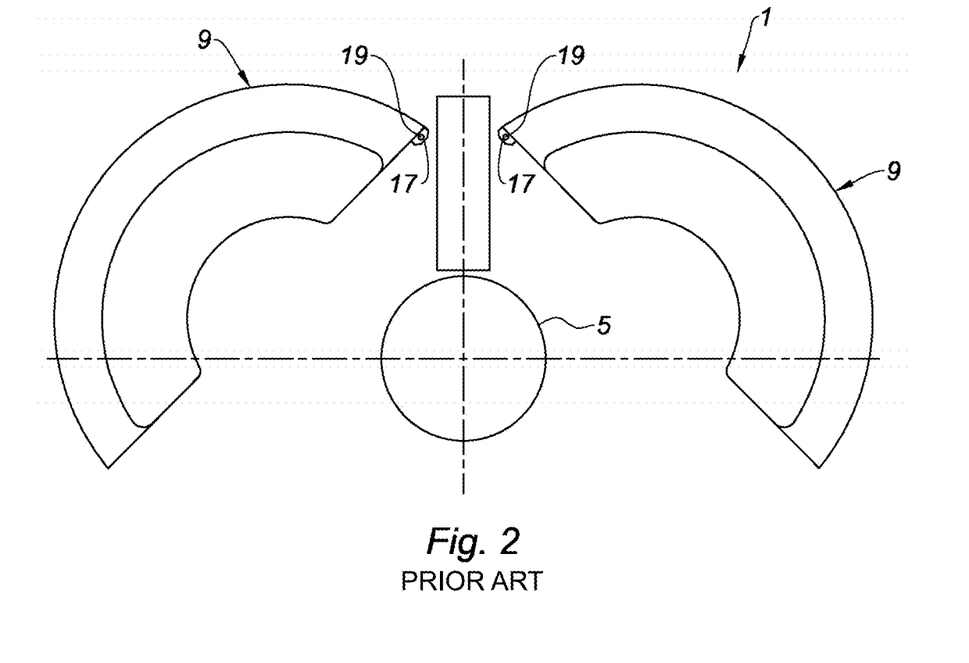
FIG. 2 shows schematically the downstream portion of the propulsion unit of FIG. 1, in the maintenance position.

Each half-cowl 9 of the thrust reverser is mounted on a hinge 17 fixed to the suspension mast 3. In order to carry out maintenance of the turbojet engine 5, it is known to access the suspension mast 3 by pivoting each half-cowl 9 of the thrust reverser about axes 19 substantially collinear with a longitudinal axis 21 of the propulsion unit, thanks to the hinges 17, as shown in FIG. 2 schematically illustrating the downstream portion of the propulsion unit 1 in the maintenance position. In this position, each half-cowl 9 of the thrust reverser has pivoted about the axes 19, and an operator can access the turbojet 5 to perform maintenance of the turbojet engine.

Also known from the prior art are thrust reversers of the C-duct type, for which each half-cowl comprises an outer half-structure and an inner half-structure, similar to those described with reference to FIGS. 1 to 4. Unlike the D-duct type thrust reverser described above, the inner half-structure of a half-cowl of D-duct type thrust reverser is not secured to the outer half-structure of said half-cowl of thrust reverser. Whatever the type of thrust reverser, C-duct or D-duct, the passage from an operating position according to which the thrust reverser is closed to a maintenance position according to which the thrust reverser is opened, is typically carried out by the actuation of a cylinder.

Figures 3, 4:
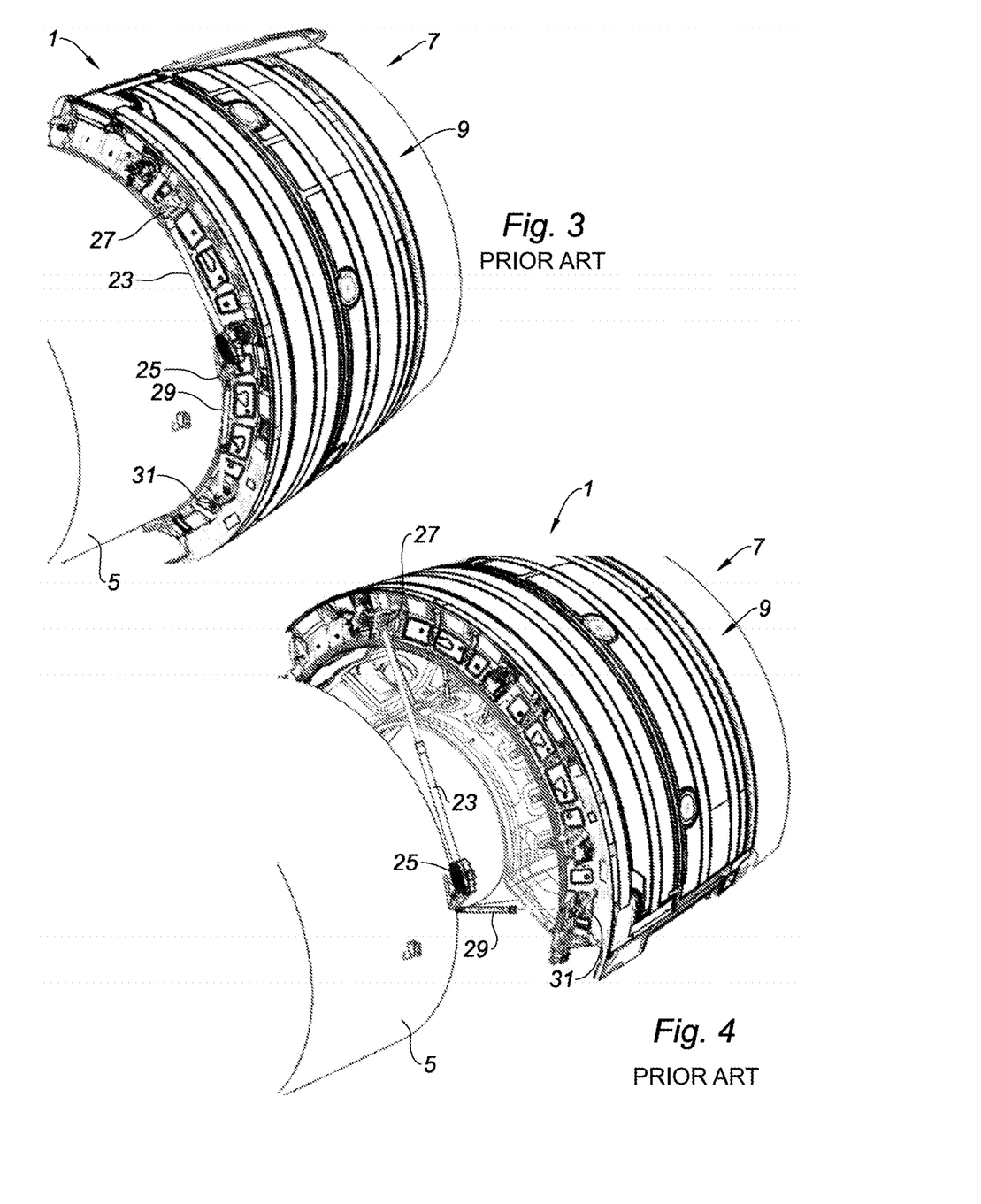
FIG. 3 illustrates the downstream portion of the propulsion unit of the prior art in an isometric view, in which the thrust reverser is shown in the operating position.
FIG. 4 illustrates a view similar to that of FIG. 3, the thrust reverser is being shown in the maintenance position.

Reference is made to FIGS. 3 and 4 which illustrate the downstream portion of the propulsion unit 1 in an isometric view, the thrust reverser 7 being shown respectively in the operating position and in the maintenance position.

The pivoting of each half-cowl 9 of the thrust reverser 7 is obtained by the actuation of a cylinder 23 called "COS" cylinder, acronym frequently used for "Cowl Opening System." The cylinder 23, which can be, for example, hydraulic, electric or pneumatic, comprises a fixed portion mounted on a fitting 25 mounted on the turbojet engine 5 and a movable portion fixed on a fitting 27 mounted on the half-cowl 9 of thrust reverser.

The holding of the cowls in the maintenance position is further reinforced thanks to a safety connecting rod 29 frequently designated by the acronym "HOR" for "Hold Open Rod." The connecting rod 29 comprises a first end fixed to the fitting 25 mounted on the turbojet engine 5, and a second end fixed to a fitting 31 mounted on the half-cowl 9.

Access to the turbojet engine can also involve the opening of half-cowls constituting the fan casing of the turbojet engine. The opening of these half-cowls can also be performed in the manner of what has been described with reference to FIGS. 1 and 2, that is to say by pivoting these half-cowls about axes substantially collinear with the longitudinal axis of the propulsion unit by means of cylinders COS and connecting rods HOR.

Among the maintenance operations currently carried out on a turbojet engine, there are maintenance operations called "regular" maintenance operations and maintenance operations called "irregular" maintenance operations.

The regular maintenance operations concern equipment of the propulsion unit which involve frequent control, typically several times a month. It is about equipment generally positioned close to the gas generator of the turbojet engine, more generally in an area of the propulsion unit having an opening angle of each half-cowl of thrust reverser comprised between about 30 and 45 degrees.

The irregular maintenance operations in turn concern equipments of the propulsion unit for which an infrequent control is involved, typically once or twice during the life of the aircraft. It is about equipment of the propulsion unit generally positioned close to the suspension mast of the turbojet engine, more generally in an area of the propulsion unit having an opening angle of each half-cowl of thrust reverser comprised between about 50 and 60 degrees.

The regular or irregular maintenance operations are accomplished thanks to the cylinder COS 23 and the connecting rod HOR 29 described with reference to FIGS. 3 and 4.

For this purpose, the cylinders 23 of the propulsion unit have a stroke enabling reaching the opening angles of the half-cowls 9 for carrying out irregular maintenance operations. The connecting rods 29 and the fittings 25, 27 and 31 are in turn sized to support the forces generated by the opening of the half-cowls during a passage in the irregular maintenance position. Such strokes of the cylinders, such a sizing of the fittings and of the connecting rods increase substantially the mass of the nacelle.

Furthermore, these cylinders COS and these connecting rods HOR of the prior art have two distinct deployment lengths, each length allowing to obtain an opening angle for regular maintenance operations and for irregular maintenance operations. Each of these two positions involve the presence of a stabilizer and of a stability indicator of the connecting rods and cylinders, aiming at indicating to the operator the reached position and inhibiting any unexpected closing of the cowl. The presence of these stabilizer and indicator of position on the cylinders COS and connecting rods HOR of the prior art complicates and increases the mass of these connecting rods and cylinders. Further, in addition to the limited reliability offered by these connecting rods and cylinders of the prior art, their manufacturing complexity leads to relatively higher manufacturing costs.

According to another form of the prior art, two attachment points of the connecting rod HOR and two attachment points of the cylinder COS equip the cowl, enabling reaching the regular and irregular maintenance positions with connecting rods and cylinders having a single deployment length. The cowl comprises for this purpose fittings adapted to support the cylinders COS and connecting rods HOR adapted to support the two maintenance positions. The presence of these two fittings for each cylinder and for each connecting rod increases the mass of the nacelle.

SUMMARY

The present disclosure aims to provide a simple utilization means allowing accessing the propulsion unit for carrying out irregular maintenance operations while reducing the mass of the nacelle relative to the prior art.

For this purpose, the present disclosure relates to a propulsion unit for an aircraft, comprising a nacelle and a turbojet engine, said propulsion unit comprising:

a stationary unit, at least one cowl pivotally mounted on an axis substantially collinear with a longitudinal axis of the propulsion unit, between an operating position and a maintenance position enabling access to the turbojet engine for regular maintenance operations and irregular maintenance operations, said irregular maintenance operations having an opening angle of said cowl relative to its operating position, greater than the opening angle of said cowl to carry out regular maintenance operations, at least one cylinder secured to the movable cowl and secured to the stationary unit by means of a main fitting mounted on the stationary unit, at least one safety connecting rod secured to the movable cowl and secured to the stationary unit by means of said main fitting, the propulsion unit according to the present disclosure being remarkable in that:

the cylinder is sized to allow an alternative passage of the cowl between an operating position and a maintenance position enabling access to the turbojet engine for regular maintenance operations, the safety connecting rod is sized to hold the cowl in the maintenance position enabling access to the turbojet engine for regular maintenance operations, the main fitting is sized to allow regular maintenance operations, and in that it comprises a secondary fitting mounted on the main fitting, said secondary fitting being sized to allow irregular maintenance operations and supporting at least said cylinder when the cowl is in a maintenance position enabling access to the turbojet engine for irregular maintenance operations.

Thus, by planning to size the cylinder, the safety connecting rod and the main fitting so as to allow regular maintenance operations, the weight of the nacelle is considerably lightened relative to the prior art, in that it is no longer necessary to size the stroke of the cylinder and the length of the safety connecting rod so as to allow a passage and a holding of the associated half-cowl in a position allowing irregular maintenance operations, for which the opening angle of said cowl is greater than that to enable the opening of said cowl in a position allowing regular maintenance operations.

The passage in a position of the movable cowl authorizing irregular maintenance operations is made possible thanks to the secondary fitting, sized to allow irregular maintenance operations and supporting at least the cylinder.

According to characteristics, all optional, of the propulsion unit according to the present disclosure:

the main fitting and the secondary fitting comprise bores adapted to receive means for holding the secondary fitting in a position allowing regular maintenance operations or in a position allowing irregular maintenance operations;

the means for holding the secondary fitting on the main fitting comprise holding rods adapted to pass at least partially through said bores;

the safety connecting rod is mounted on the secondary fitting when the secondary fitting is positioned so as to authorize irregular maintenance operations;

the safety connecting rod is mounted on the stationary unit of the propulsion unit when the secondary fitting is positioned so as to authorize irregular maintenance operations;

the secondary fitting has a substantially triangular shape;

the safety connecting rod is mounted on an extension of the secondary fitting;

the cowl is constituted by a cowl comprised in the following group: half-cowl of D-duct type thrust reverser, half-cowl of C-duct type thrust reverser, door of thrust reverser with doors, half-cowl of fan casing of the turbojet engine.

The present disclosure also concerns a method for opening a movable cowl of propulsion unit according to a first form of the present disclosure, remarkable in that it comprises the following steps aiming at:

extending the cylinder until opening the cowl in a position adapted for regular maintenance operations;

disconnecting the cylinder from the main fitting;

positioning the secondary fitting on the main fitting; the secondary fitting is considered as a maintenance tool and is therefore not embarked in the aircraft. It is available in the maintenance workshops which carry out the irregular maintenance tasks. The regular maintenance tasks may in turn be able to be carried out on any airport where the aircraft lands;

fixing the cylinder on the secondary fitting so that said cylinder absorbs the forces of the cowl;

disconnecting the safety connecting rod from the main fitting;

fixing the safety connecting rod on the secondary fitting.

The present disclosure further concerns a method for opening a movable cowl of propulsion unit according to a second form of the present disclosure, remarkable in that it comprises the following steps aiming at:

extending the cylinder until opening the cowl in a position adapted for regular maintenance operations;

pivoting the secondary fitting so as to at least increase the relative distance between an attachment point of the cylinder and the main fitting;

disconnecting the safety connecting rod from the main fitting;

fixing the safety connecting rod on the secondary fitting or on the stationary unit of the propulsion unit.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be noted that in the present disclosure, the terms "upstream" and "downstream" refers to the circulation of the airflow inside the propulsion unit formed by the nacelle and the turbojet engine, that is to say from left to right with reference to FIGS. 5 to 12.

Further, on all the figures, identical or similar references represent identical or similar members or sets of members.

In the present disclosure, a, stationary unit of the propulsion unit means a region of the propulsion unit which remains immobile during a passage between an operating position and a maintenance position. This region can belong to the turbojet engine or to the nacelle.

FIGS. 5 to 10 refer to a propulsion unit 101 carried out according to a first form of the present disclosure.

Figure 5:
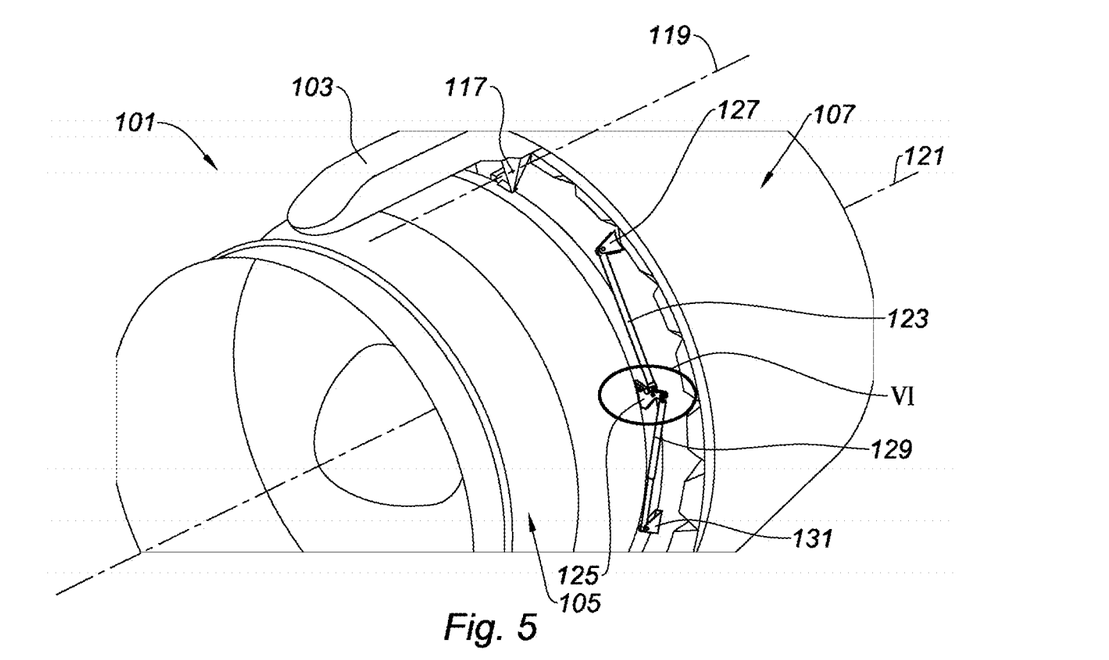
FIG. 5 shows in an isometric view the propulsion unit according to a first form of the present disclosure, in which the cowl of thrust reverser is in the operating position.

Reference is made to FIG. 5 showing the propulsion unit 101 in an isometric view, in which the cowl of thrust reverser is in the operating position.

The propulsion unit 101 comprises a nacelle, in a downstream portion of which is mounted a thrust reverser 107, and a turbojet engine 105 constituting a stationary unit of the propulsion unit.

The propulsion unit 101 is suspended from a fixed structure of the aircraft, for example under a wing or on the fuselage, by means of a suspension mast 103, fastened to the turbojet engine 105.

The thrust reverser 107 of the propulsion unit 101 comprises two semi-annular half-cowls 109 surrounding the downstream section of the turbojet engine 105. In FIG. 5, only one of these two half-cowls has been shown.

The thrust reverser 107 shown in FIG. 5 is of the "D-duct" type, but the present disclosure also applies to the thrust reversers of the "C-duct" type.

The half-cowl 109 of the thrust reverser 107 is mounted on a hinge 117 fixed to the suspension mast 103.

The thrust reverser 107 of the propulsion unit 101 comprises cylinders 123 called cylinders "COS," which can be, for example, hydraulic, electric or pneumatic cylinders as well as safety connecting rods 129 called connecting rods "HOR."

Each cylinder 123 comprises a fixed portion mounted on the main fitting 125, and a movable portion fixed to a fitting 127 mounted on the half-cowl 9 of thrust reverser, while each safety connecting rod 129 is made secured to the turbojet engine and to the movable cowl, in that each connecting rod comprises a first end fixed to the main fitting 125 and a second end fixed to a fitting 131 mounted on the half-cowl 109.

Figure 6:
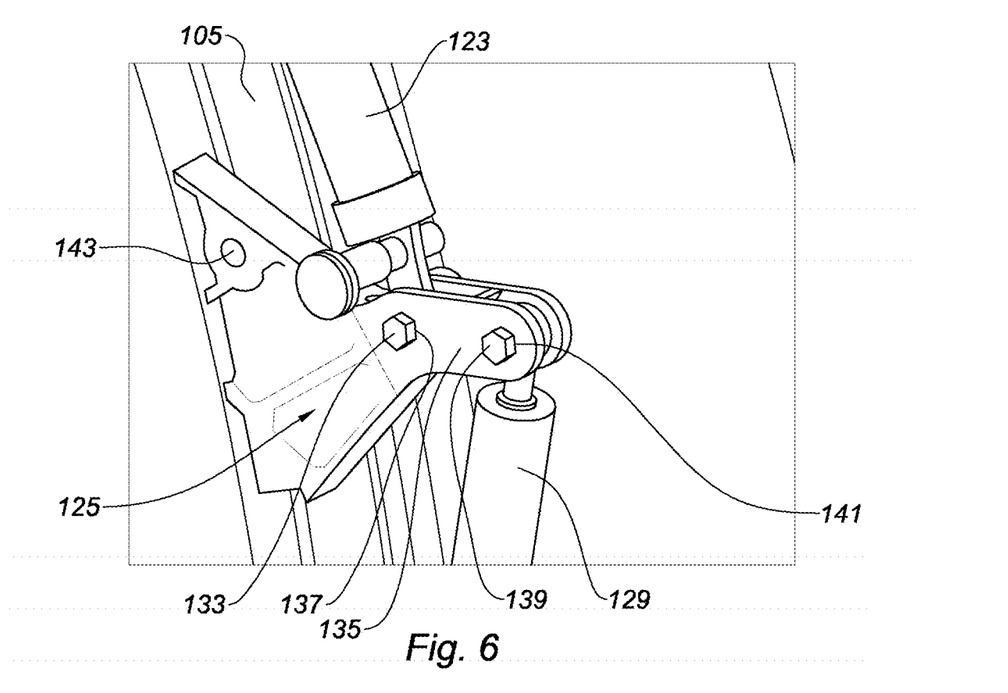
FIG. 6 is a detailed view of the area VI of FIG. 5.

As shown in more detail in FIG. 6, illustrating an enlargement of the area VI of FIG. 5, the cylinder 123 is secured to the turbojet engine 105 by means of the main fitting 125 mounted on the turbojet engine 105. The cylinder 123 is mounted on the main fitting by means of a holding rod 133, substantially transverse to a side wall 135 of said fitting and passing through the main fitting thanks to a bore 137 passing through the thickness of the fitting 125. The safety connecting rod 129 is in turn pivotally mounted on a holding rod 139, which is also substantially transverse to the side wall 135 of said fitting and passing through the main fitting thanks to a bore 141 passing through the thickness of the fitting 125. The main fitting 125 comprises further a bore 143 passing through the thickness of said fitting.

According to the present disclosure, the main fitting 125 is sized to allow regular maintenance operations, that is to say that it has mechanical characteristics adapted to support maintenance operations authorizing access to the turbojet engine for regular maintenance operations.

The passage from an operating position to a maintenance position enabling access to the turbojet engine for regular maintenance operations is carried out by pivoting each half-cowl 109 of the thrust reverser 107 about an axis 119 substantially collinear with a longitudinal axis 121 of the propulsion unit, thanks to the hinges 117.

The pivoting of each half-cowl 109 of the thrust reverser 107 is obtained by the actuation of the cylinder 123. According to the present disclosure, the cylinder 123 is sized to allow an alternative passage between an operating position and a maintenance position enabling access to the turbojet engine for regular maintenance operations.

Figure 7:
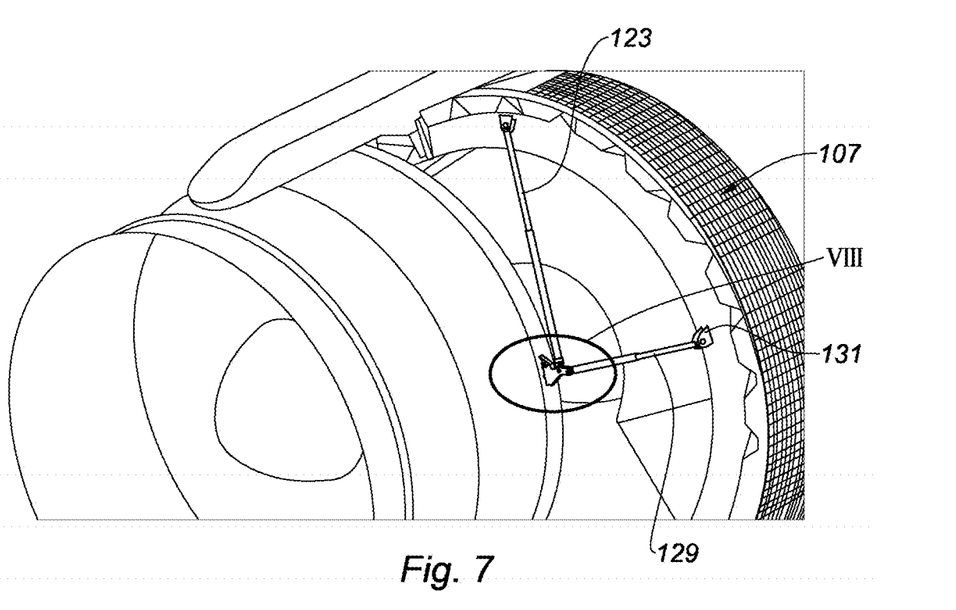
FIG. 7 shows in an isometric view the propulsion unit of FIG. 5, in which the cowl of thrust reverser is in the maintenance position enabling access to the turbojet engine for regular maintenance operations.

FIG. 7 illustrates the half-cowl 109 in the regular maintenance position, the position in which the half-cowl 109 has pivoted at an angle comprised between about 30 and about 45 degrees relative to its operating position. This maintenance position, called regular maintenance position, authorizes an access to the equipments generally positioned close to the gas generator of the turbojet engine.

The holding of each half-cowl 109 in the regular maintenance position is reinforced thanks to the safety connecting rod 129, sized to maintain the half-cowl in the maintenance position enabling access to the turbojet engine for regular maintenance operations.

Figure 8:
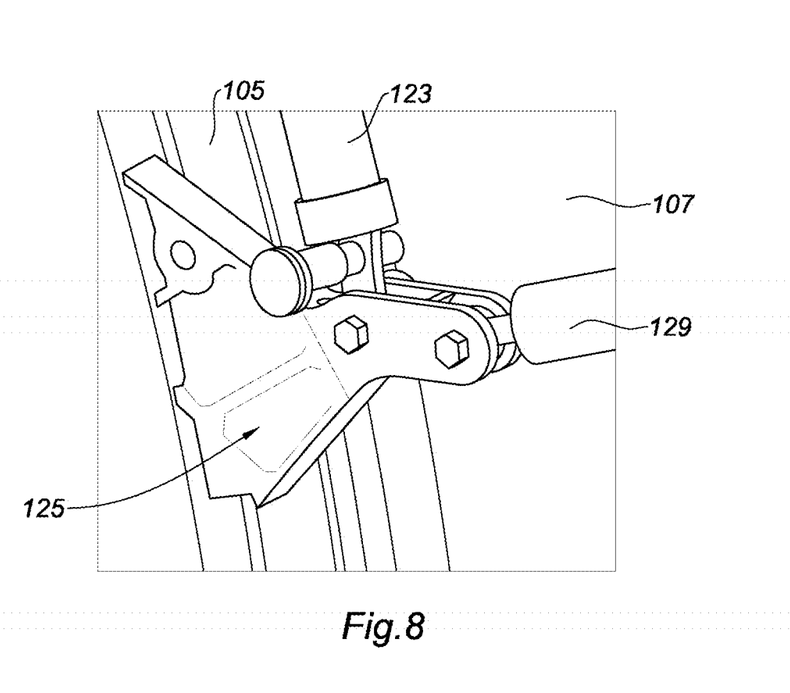
FIG. 8 is a detailed view of the area VIII of FIG. 7.

FIG. 8 is an enlargement of the area VIII of FIG. 7, on which the safety connecting rod 129 has pivoted on the rod 139, relative to the position shown in FIG. 6.

When an operator desires to carry out irregular maintenance operations, operations concerning equipments of the propulsion unit generally positioned close to the suspension mast of the turbojet engine, and more generally in an area of the propulsion unit having an opening angle of each half-cowl of thrust reverser comprised between about 50 and 60 degrees, the operator proceeds in the following manner, following the method of opening movable cowls of the propulsion unit according to the present disclosure, whose steps are illustrated in FIGS. 9a to 9f to which reference is now made.

Figure 9A:
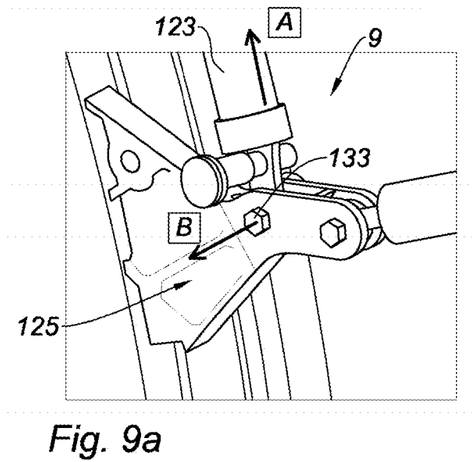
FIGS. 9a to 9f illustrate the steps of the method according to the present disclosure allowing to pass from a maintenance position of the cowl of thrust reverser enabling access to the turbojet engine for regular maintenance operations to a maintenance position enabling access to the turbojet engine for irregular maintenance operations.

When the half-cowls 9 are in the operating position, that is to say closed, the operator actuates the cylinders 123 in order to extend them (step A of FIG. 9a) until they come into end of stroke abutment and are in a position in which the half-cowls 9 are open in a position allowing regular maintenance operations, the position having typically an opening angle comprised between about 30 and about 45 degrees relative to their operating position. This position is shown in FIG. 9a.

Figure 9B:
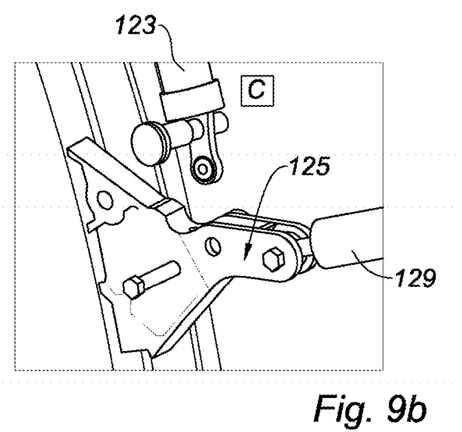

In this position, the half-cowls 9 are maintained in the regular maintenance position by means of the safety connecting rods 129, which are locked, in abutment. In this position, no force transits through the cylinders 123, and the operator removes the rods 133 on which the cylinders 123 are mounted (step B), which allows to disconnect the cylinders 123 from their main fitting 125, in complete safety. The fixed end of each cylinder 123 is then moved so as to shorten the length of the cylinder (step C), as illustrated in FIG. 9b.

Figure 9C:
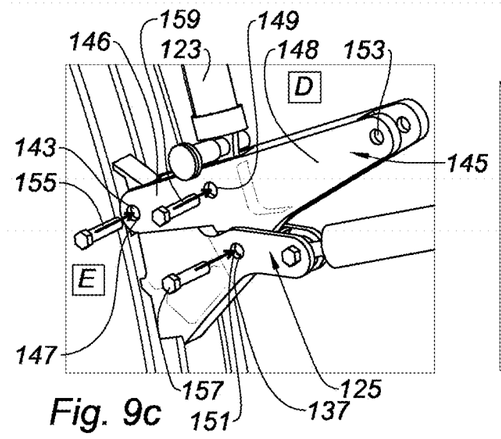

As shown in FIG. 9c, the operator positions a secondary fitting 145 on the main fitting 125 (step D). The secondary fitting has a substantially triangular shape, having a base 146 and an extension 148, and is sized to allow irregular maintenance operations, and has for this purpose mechanical characteristics and a geometry adapted to support maintenance operations authorizing access to the turbojet engine for irregular maintenance operations.

The secondary fitting 145 comprises four bores 147, 149, 151, 153, for example passing through the thickness of the fitting, whose positioning in the alignment of some of the bores of the main fitting allows the holding of the secondary fitting on the main fitting, by means of rods passing through said bores. The bores 147, 149 and 151 are carried out at the base 146 of the secondary fitting 145, and the bore 153 is in turn carried out at the extension 148 of the secondary fitting.

The operator introduces a holding rod 155 passing through the bore 147 of the secondary fitting and the bore 143 of the main fitting, and a holding rod 157 passing through the bore 151 of the secondary fitting and the bore 137 of the main fitting, which provides the holding of the secondary fitting 145 on the main fitting 125. The operator then introduces a holding rod 159 passing through the bore 149 of the secondary fitting 145 and supporting the cylinder 123 (step E). The operator then adjusts the cylinder so as to relieve the safety connecting rod 129, until the cylinder 123 absorbs the forces of the associated half-cowl 9.

Figure 9D:
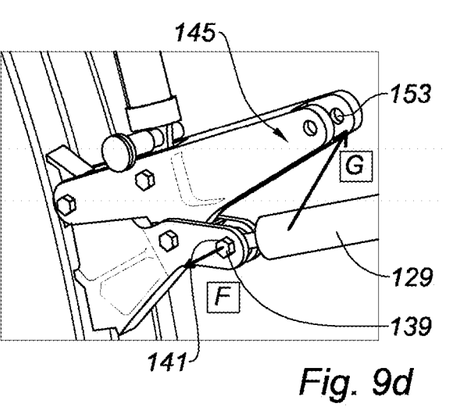

As illustrated in FIG. 9d, the rod 139, on which the safety connecting rod 129 is mounted, is removed (step F), and the connecting rod 129 is disconnected from the main fitting 125. The end of the safety connecting rod 129 is moved in the direction of the bore 153 of the secondary fitting 145 (step G).

Figure 9E:
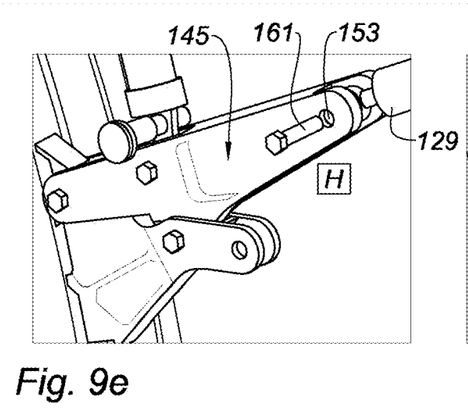

The safety connecting rod 129 is then fixed on the extension 148 of the secondary fitting 145 by means of a holding rod 161 passing through the bore 153 of the secondary fitting 145 (step H).

Figure 9F:
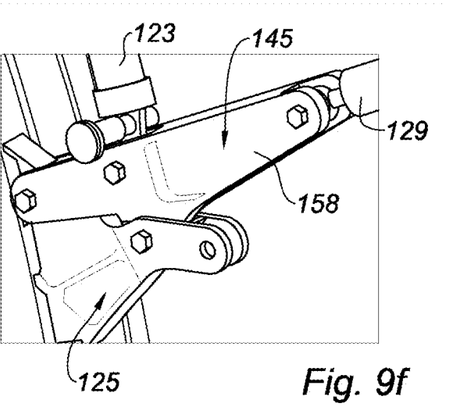
Figure 10:
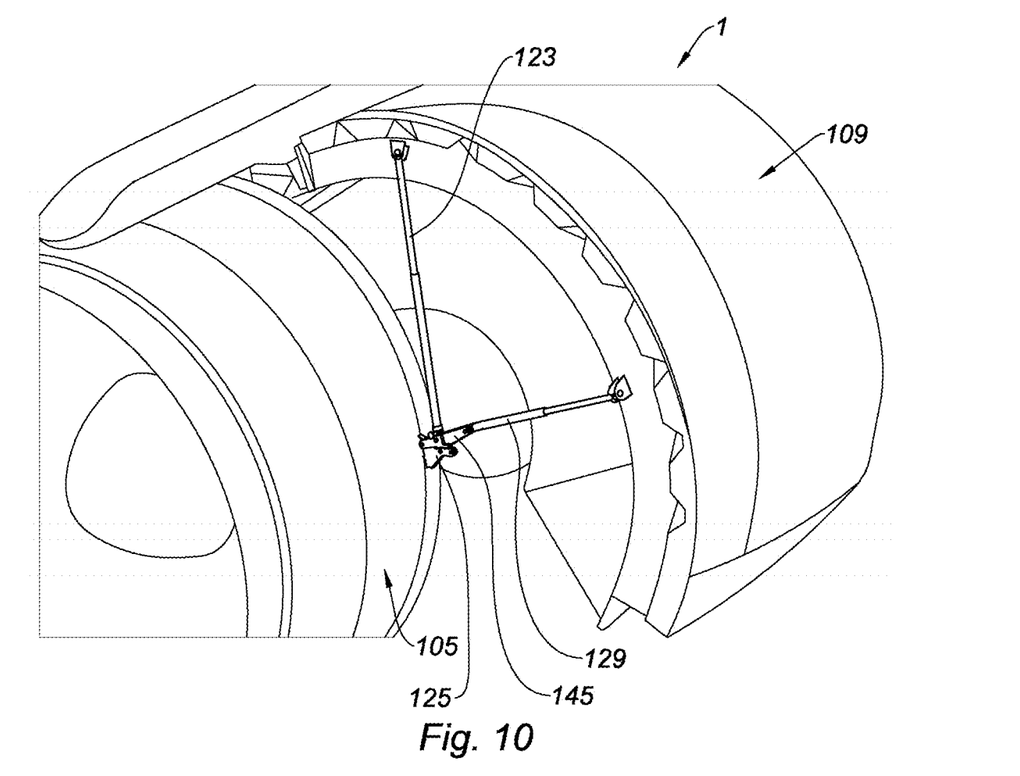
FIG. 10 shows in an isometric view the propulsion unit of FIG. 5, in which the cowl of thrust reverser is in the maintenance position enabling access to the turbojet engine for irregular maintenance operations.

FIG. 9f illustrates the propulsion unit according to the present disclosure, equipped with the secondary fitting 145 according to the present disclosure, on which the cylinder COS 123 and the safety connecting rod HOR 129 are fixed. The propulsion unit 101 according to the present disclosure is illustrated in FIG. 10 in the maintenance position allowing carrying out irregular maintenance operations.

The presence of the secondary fitting 145 has allowed moving the attachment points of the cylinder 123 and of the safety connecting rod 129 by a few centimeters relative to those initially provided on the main fitting 125 to carry out regular maintenance operations. More precisely, the presence of the secondary fitting allows increasing by a few centimeters the relative distance between the attachment point of the cylinder COS and the main fitting, as well as the relative distance between the attachment point of the safety connecting rod HOR and the main fitting. This allows obtaining a more significant stroke of the cylinder COS and a more significant length of the safety connecting rod HOR compared to those obtained when the cylinders COS and the safety connecting rods HOR were positioned on the main fitting. A cylinder stroke and an connecting rod length are then kept identical for regular and irregular maintenance operations, which allows to have cylinders COS and connecting rod HOR with a single stable position and sized for regular maintenance operations, unlike the cylinders COS and to the connecting rods HOR of the prior art, sized to support the irregular maintenance operations having a more significant opening angle of the half-cowls than that for carrying out regular maintenance operations. This then allows to reduce the weight of the propulsion unit in that the weight of the connecting rods HOR, the cylinders COS and the main fitting is less than that obtained according to the prior art in which these parts are more complex, due to the need for two stable positions and their oversizing.

According to a second form of the present disclosure, the secondary fitting is fixedly mounted on the main fitting, either in such a way as to allow regular maintenance operations or in such a way as to allow irregular maintenance operations. Unlike the first form which plans to mount the secondary fitting on the main fitting when it is desired to carry out irregular maintenance operations, the second form provides for a permanent mounting of the secondary fitting on the main fitting.

According to a first variant of this second form, shown in FIGS. 11a to 11f, to which reference is now made, the secondary fitting 245 has a substantially triangular shape, having a base 246 and an extension 248.

The main fitting 225 comprises four bores 263, 265, 267 and 269 (269 shown in FIG. 11c), for example passing through the thickness of the main fitting, and the secondary fitting also comprises four bores 247, 249, 251, 253, for example passing through the thickness of the secondary fitting. The bores 247, 249 and 251 are carried out at the base 246 of the secondary fitting 245, and the bore 253 is in turn carried out at the extension 248 of the secondary fitting.

Figure 11A:
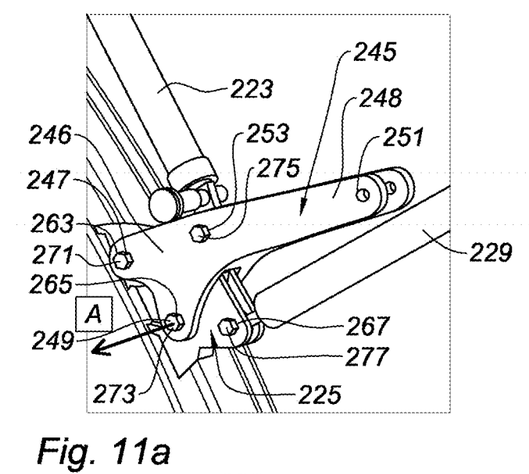
FIGS. 11a to 11f relate to a first variant of a second form of the present disclosure.
Figure 11B:
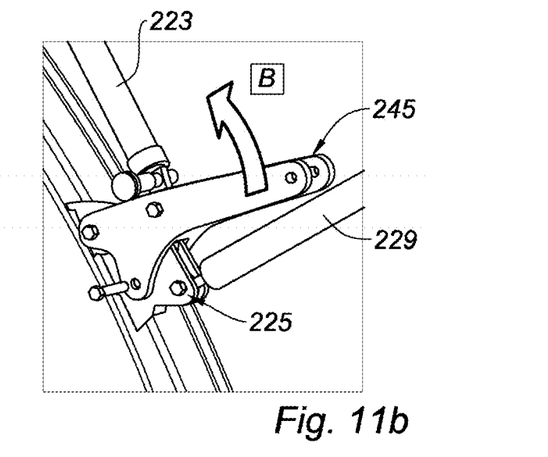

When the half-cowls 9 are in the maintenance position to carry out regular maintenance operations, the position shown in FIG. 11a, the bores 247 and 249 of the secondary fitting 245 are positioned respectively opposite the bores 263 and 265 of the main fitting 225. Holding rods 271 and 273, each substantially transverse to a side wall of the main fitting, pass respectively through the bores 247, 263 and the bores 249, 265, which allows the holding of the secondary fitting on the main fitting, both in the maintenance position, shown in FIG. 12a, and in the operating position, not shown.

In the operating position and in the maintenance position for carrying out regular maintenance operations, the fixed portion of the cylinder 223 is mounted on the secondary fitting 245 thanks to a holding rod 275 passing through the bore 253 of the secondary fitting, and the movable portion of said cylinder is fixed on a fitting mounted on the half-cowl of thrust reverser. In these same positions, the safety connecting rod 229 is in turn linked to the main fitting 225 by means of a holding rod 277 passing through the bore 267 of the main fitting, and to a fitting mounted on the half-cowl of thrust reverser.

When an operator desires to carry out irregular maintenance operations, he proceeds in the following manner, for each unit comprising the cylinder COS and of the connecting rod HOR.

The operator removes the holding rod 273 passing through the bores 249 and 265 (step A).

The operator then performs, manually and without using tools, a rotation of the secondary fitting 245 (step B, FIG. 11b) in the counterclockwise direction when the propulsion unit is viewed from upstream to downstream. By pivoting in this way the secondary fitting 245, the relative distance between the attachment point of the cylinder 223 and the main fitting 225 has been increased by a few centimeters. This allows obtaining a more significant stroke of the cylinder 223 compared to that obtained when the secondary fitting 245 was mounted on the main fitting 225 in its position illustrated in FIG. 11a.

Figure 11C:
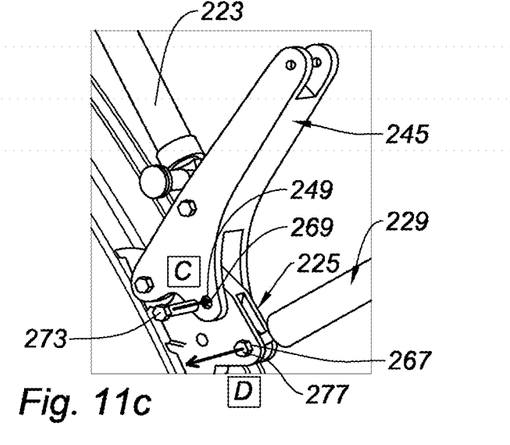

When the cylinder 223 is in the position shown in FIG. 11c, the holding rod 273 is introduced in the bore 249 of the secondary fitting 245, which is positioned opposite the bore 269 of the main fitting 225 (step C). The rod 277 ensuring the holding of the safety connecting rod 229 on the main fitting 225 is removed from the bore 267 (step D).

Figure 11D:
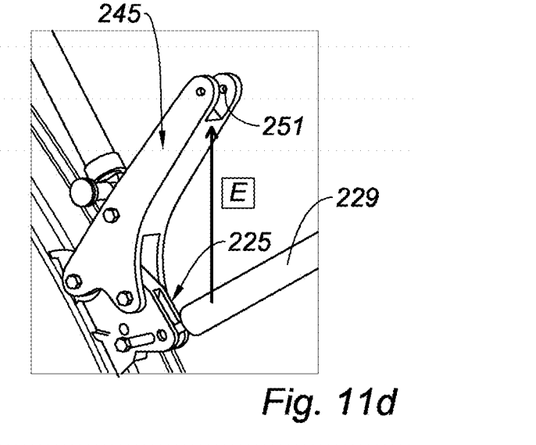

As illustrated in FIG. 11d, the safety connecting rod 229 is disconnected from the main fitting 225, and the end of said connecting rod is moved in the direction of the bore 251 of the secondary fitting 245 (step E).

Figure 11E:
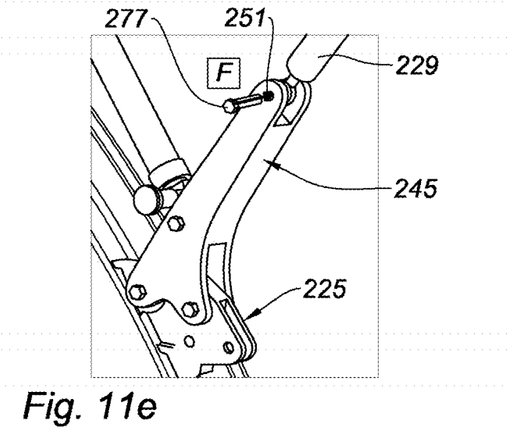

The safety connecting rod 229 is then fixed on the extension 258 of the secondary fitting 245 by means of the holding rod 277, passing now through the bore 251 of the secondary fitting 245 (step H).

Figure 11F:
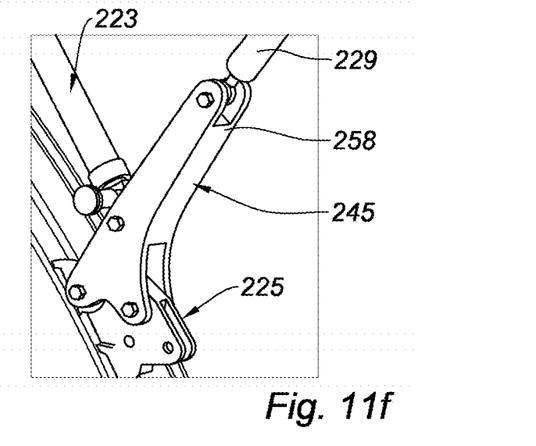

FIG. 11f illustrates the propulsion unit according to the present disclosure, equipped with the secondary fitting 245 according to the present disclosure, on which the cylinder COS 223 and the safety connecting rod HOR 229 are fixed.

The rotation of the secondary fitting 245 has allowed to increase by a few centimeters the relative distance between the attachment point of the cylinder 223 and the main fitting 225, as well as the relative distance between the attachment point of the safety connecting rod 229 and the main fitting, relative to their position in which the cylinder and the safety connecting rod allow to carry out regular maintenance operations. This allows to obtain a more significant stroke of the cylinder 223 and a more significant length of the safety connecting rod compared to those obtained when the secondary fitting 245 was mounted on the main fitting 225 in the position illustrated in FIG. 11a.

As in the first form, this second form allows having cylinders COS and connecting rods HOR with a single stable position and sized for regular maintenance operations, unlike the cylinders COS and the connecting rods HOR of the prior art, sized to support the irregular maintenance operations having a more significant opening angle of the half-cowls than that to carry out regular maintenance operations. This allows then to reduce the weight of the propulsion unit in that the weight of the connecting rods HOR, the cylinders COS and the main fitting is less than that obtained according to the prior art in which these parts are more complex due to the need for two stable positions and their oversizing.

According to a second variant of this second form, shown in FIGS. 12a to 12f to which reference is made now, the secondary fitting 345 has a triangular shape.

The main fitting 325 is identical to the main fitting 225 and comprises four bores 363, 365, 367 and 369 (369 shown in FIG. 12d), for example passing through the thickness of the main fitting. The secondary fitting 345 differs from the secondary fittings 145 and 245 in that it does not have an extension. The secondary fitting 345 comprises three bores 347, 349 and 353, for example passing through the thickness of the secondary fitting.

Figure 12A:
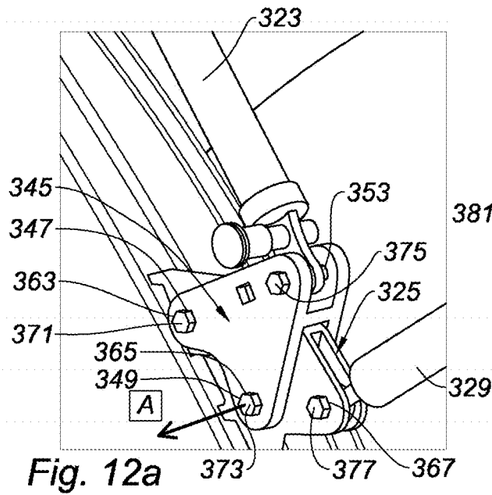
FIGS. 12a to 12f relate to a second variant of the second form of the present disclosure.

When the half-cowls 9 are in the maintenance position to carry out regular maintenance operations, the position shown in FIG. 12a, the bores 347 and 349 of the secondary fitting 345 are respectively positioned opposite the bores 363 and 365 of the main fitting 325. Holding rods 371 and 373, each substantially transverse to a side wall of the main fitting, pass respectively through the bores 347, 363 and the bores 349, 365, which allows the holding of the secondary fitting on the main fitting, both in the maintenance position, shown in FIG. 12a, and in the operating position, not shown.

In the operating position and in the maintenance position for carrying out regular maintenance operations, the fixed portion of the cylinder 323 is mounted on one of the apexes of the triangle constituted of the secondary fitting 345, thanks to a holding rod 375 passing through the bore 353 of the secondary fitting, and the movable portion of said cylinder is fixed on a fitting mounted on the half-cowl of thrust reverser. In these same positions, the safety connecting rod 329 is in turn linked to the main fitting 325 by means of a holding rod 377 passing through the bore 367 of the main fitting, and to a fitting mounted on the half-cowl of thrust reverser.

When an operator desires to carry out irregular maintenance operations, he proceeds in the following manner, for each unit consisting of the cylinder COS and the connecting rod HOR.

The operator removes the holding rod 373 passing through the bores 349 and 365 (step A).

Figure 12B:
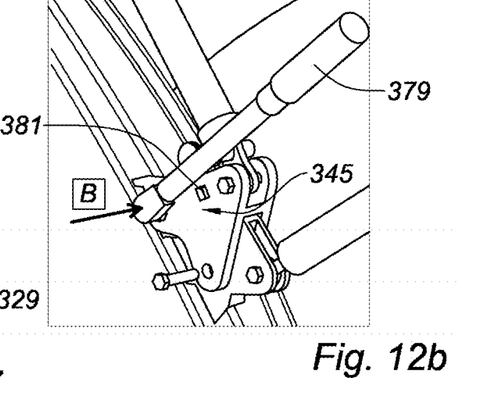
Figure 12C:
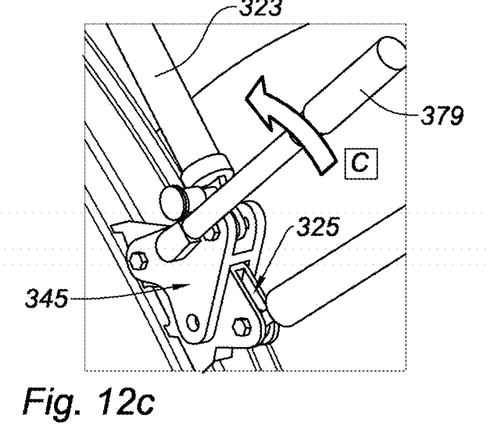

The operator then introduces a key 379 in a driving square 381 of the secondary fitting 345 (step B, FIG. 12b). This key is of the standard type and allows mounting temporarily a lever arm on the secondary fitting 345. The operator then performs a rotation of the secondary fitting 345 (step C, FIG. 12c) thanks to the key 379 in the counterclockwise direction when the propulsion unit is viewed from upstream to downstream. By pivoting in this way the secondary fitting 345, the relative distance between the attachment point of the cylinder 323 and the main fitting 325 has been increased by a few centimeters. This allows to obtain a more significant stroke of the cylinder 323 compared to that obtained when the secondary fitting 345 was mounted on the main fitting 325 in its position illustrated in FIG. 12a.

Figure 12D:
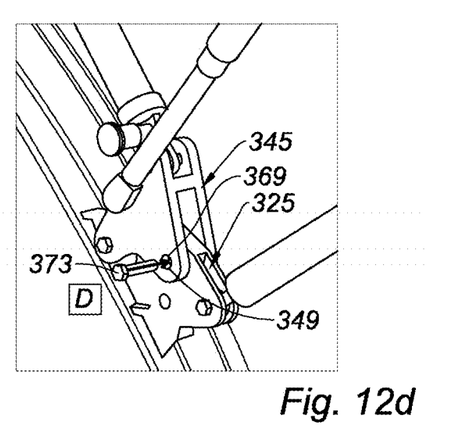

When the cylinder 323 is in the position shown in FIG. 12d, the holding rod 373 is introduced in the bore 349 of the secondary fitting 345, which is positioned opposite the bore 369 of the main fitting 325 (step D).

Figure 12E:
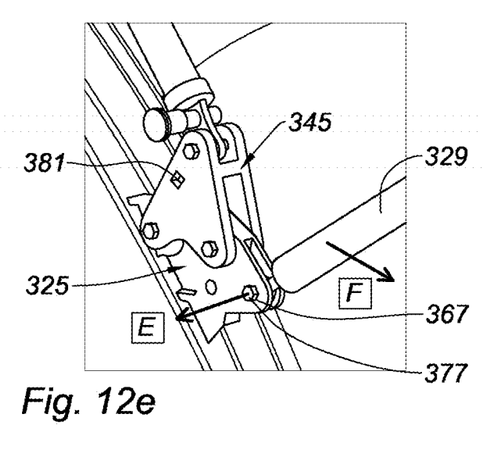

As shown in FIG. 12e, the key is removed from the driving square 381, and the rod 377 ensuring the holding of the safety connecting rod 329 on the main fitting 325 is removed from the bore 367 (step E). The safety connecting rod 329 is then disconnected from the main fitting 325 (step F), and the end of said connecting rod is moved at an attachment point (non shown) provided on the turbojet engine, said attachment point being chosen so as to allow an opening of the cowl in the irregular maintenance position, having an opening angle greater than that for a regular maintenance operation.

Figure 12F:
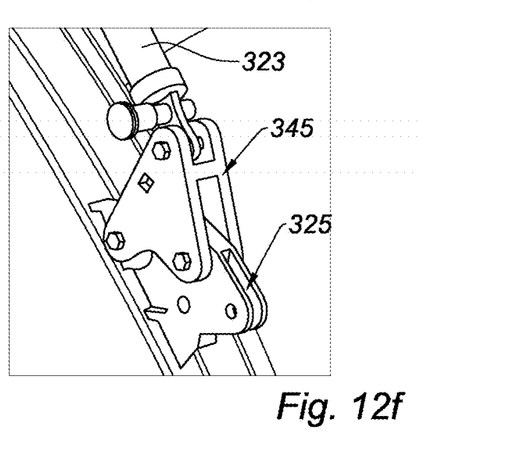

FIG. 12f illustrates the propulsion unit according to the present disclosure, equipped with the secondary fitting 345 according to the present disclosure, on which the cylinder COS 323 is fixed, the safety connecting rod HOR 329 not being shown in this Figure.

The rotation of the secondary fitting 345 has allowed increasing by a few centimeters the relative distance between the attachment point of the cylinder 323 and the main fitting 325, relative to its position in which the cylinder allows to carry out regular maintenance operations. This allows to obtain a more significant stroke of the cylinder 323 compared to that obtained when the secondary fitting 345 was mounted on the main fitting 325 in its position illustrated in FIG. 12a. The safety connecting rod 329 is in turn positioned on an attachment point of the turbojet engine, which is distinct from the secondary fitting. This attachment point is chosen so that the connecting rod allows the holding of the cowl in a position authorizing irregular maintenance operations of the propulsion unit.

As in the first form and the first variant of the second form, this variant allows having cylinders COS and connecting rods HOR with a single stable position and sized for regular maintenance operations, unlike the cylinders COS and the connecting rods HOR of the prior art, sized to support the irregular maintenance operations having a more significant opening angle of the half-cowls than for carrying out regular maintenance operations. This allows then to reduce the weight of the propulsion unit in that the weight of the connecting rods HOR, the cylinders COS and the main fitting is less than that obtained according to the prior art in which these parts are more complex (two stable positions) and are oversized.

According to an aspect common to the two forms of the present disclosure, the cables or pipes disposed at the hinge portion of the cowls of thrust reverser and supplying equipments secured to cowls of thrust reverser, are also shortened relative to the prior art, so as to authorize one opening of the cowls of thrust reverser in a regular maintenance position.

When it is desired to move the propulsion unit in the irregular maintenance position, the parts in the opening hinge area of the cowls are removed in order not to inhibit the opening of the cowls in the irregular maintenance position.

This allows advantageously to limit also the weight of the propulsion unit, in that all of these pipes and cables are sized to allow the opening of the cowl in the maintenance position authorizing regular maintenance operations.

The description of the present application refers to cowls of D-duct type thrust reverser. It should be understood that the present disclosure is in no way limited to the half-cowls of D-duct type thrust reverser, but that it encompasses on the contrary all types of movable cowls of the propulsion unit, such as, for example, a half-cowl of a C-duct thrust reverser, a door for a thrust reverser with doors, or even a half-cowl of fan casing of turbojet engine.

It goes without saying that the present disclosure is not limited to the sole variations of the propulsion unit, described above only by way of illustrative examples, but it embraces, on the contrary, all the variants involving the technical equivalents of the means described as well as their combinations if these are within the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A propulsion unit for an aircraft comprising:
a stationary unit;
at least one cowl pivotally mounted on an axis collinear with a longitudinal axis of the propulsion unit between at least one of an operating position and a maintenance position allowing access to a turbojet engine for regular maintenance operations and irregular maintenance operations, wherein the maintenance position for irregular maintenance operations includes an opening angle of the at least one cowl, which is between 50 degrees and 60 degrees relative to the operating position and which is greater than the opening angle of the at least one cowl for regular maintenance operations, the opening angle of the at least one cowl for regular maintenance operations being between about 30 degrees and 45 degrees relative to the operating position;

at least one cylinder secured to the at least one cowl and secured to the stationary unit by means of a main fitting mounted on the stationary unit; and at least one safety connecting rod secured to the at least one cowl and the stationary unit by means of the main fitting, wherein the cylinder is sized configured to allow an alternative passage of the at least one cowl between at least one of an operating position and a maintenance position allowing access to the turbojet engine for regular maintenance operations, wherein the safety connecting rod is configured to maintain the at least one cowl in the maintenance position allowing access to the turbojet engine for regular maintenance operations, wherein the main fitting is configured to allow regular maintenance operations, and wherein the main fitting comprises a secondary fitting mounted on the main fitting, the secondary fitting being configured to allow irregular maintenance operations, wherein the secondary fitting supports the at least one cylinder when the at least one cowl is in the maintenance position allowing access to the turbojet engine for irregular maintenance operations.

2. The propulsion unit according to claim 1, wherein the main fitting and the secondary fitting further each comprises at least one bore adapted to receive a means for holding the secondary fitting on the main fitting in a position allowing regular maintenance operations or in a position allowing irregular maintenance operations.

3. The propulsion unit according to claim 2, wherein the means for holding the secondary fitting on the main fitting further comprises holding rods adapted to pass at least partially through the at least one bore.

4. The propulsion unit according to claim 1, wherein the secondary fitting is removably mounted on the main fitting and the at least one safety connecting rod is mounted on the secondary fitting during irregular maintenance operations.

5. The propulsion unit according to claim 1, wherein the at least one safety connecting rod is mounted on the stationary unit of the propulsion unit when the secondary fitting is removably mounted on the main fitting during irregular maintenance operations.

6. The propulsion unit according to claim 1, wherein the secondary fitting has a triangular shape.

7. The propulsion unit according to claim 1, wherein the at least one safety connecting rod is mounted on an extension of the secondary fitting.

8. The propulsion unit according to claim 1, wherein the at least one cowl is selected from the group consisting of half-cowl of D-duct type thrust reverser, half-cowl of C-duct type thrust reverser, door for a thrust reverser with doors, half-cowl of fan casing of the turbojet engine, and combinations thereof.

9. A method for opening a movable cowl of the propulsion unit according to claim 1, the method comprising:
    extending the cylinder until opening the cowl in a position adapted for regular maintenance operations;
    disconnecting the cylinder from the main fitting;
    positioning the secondary fitting on the main fitting;
    fixing the cylinder on the secondary fitting so that the cylinder absorbs forces of the cowl;
    disconnecting the safety connecting rod from the main fitting; and
    fixing the safety connecting rod on the secondary fitting.

10. The method according to claim 9, the method further comprising:
    extending the cylinder until opening the cowl in a position adapted for regular maintenance operations;
    pivoting the secondary fitting so as to at least increase a relative distance between attachment points of the cylinder and the main fitting;
    disconnecting the safety connecting rod from the main fitting; and
    fixing the safety connecting rod on at least one of the secondary fitting and the stationary unit of the propulsion unit.

* * * * *